(12) United States Patent
Breidenbach et al.

(10) Patent No.: US 6,558,262 B1
(45) Date of Patent: May 6, 2003

(54) BOOT FOR SLIP YOKE ASSEMBLY IN A VEHICLE DRIVESHAFT

(75) Inventors: Kevin J. Breidenbach, Mooresville, NC (US); Ronald W. Dunbar, Jr., Charlotte, NC (US); Glenn M. Hargett, Matthews, NC (US)

(73) Assignee: Torque-Traction Technologies, Inc., Holland, OH (US)

( * ) Notice: Subject to any disclaimer, the term of this patent is extended or adjusted under 35 U.S.C. 154(b) by 0 days.

(21) Appl. No.: 09/747,704

(22) Filed: Dec. 22, 2000

(51) Int. Cl.[7] ............................................. F16D 3/84
(52) U.S. Cl. ..................................... 464/175; 277/636
(58) Field of Search ............................... 464/173, 175; 285/236, 23, 226; 403/50, 51; 277/635, 636, 637; 217/93; 292/307 B

(56) References Cited

U.S. PATENT DOCUMENTS

| | | | | |
|---|---|---|---|---|
| 973,687 A | * | 10/1910 | Naylor | ........................ 217/93 |
| 1,311,360 A | * | 7/1919 | Traub | ........................ 217/93 |
| 2,025,635 A | | 12/1935 | Bishoff | |
| 2,134,358 A | | 10/1938 | Crossland | |
| 2,277,419 A | * | 3/1942 | Smoot | ................. 464/173 X |
| 2,810,593 A | * | 10/1957 | Petoskey | ................. 285/236 |
| 3,164,401 A | * | 1/1965 | Fawkes | ................. 285/236 X |
| 3,166,812 A | * | 1/1965 | Hepburn | ................. 285/236 X |
| 3,365,218 A | * | 1/1968 | Denyes | ................. 285/253 |
| 3,729,027 A | * | 4/1973 | Bare | ................. 285/244 X |
| 4,199,159 A | | 4/1980 | Evans | |
| 4,270,442 A | | 6/1981 | Bainard et al. | |
| 4,279,426 A | * | 7/1981 | Flack, Jr. | ................. 277/637 X |
| 4,443,207 A | | 4/1984 | Buthe et al. | |
| 4,991,457 A | | 2/1991 | Chen | |
| 5,002,094 A | * | 3/1991 | Brovont | ................... 285/236 X |
| 5,078,652 A | * | 1/1992 | Baker | .......................... 464/175 |
| 5,586,939 A | * | 12/1996 | Swinney | ................... 464/151 X |
| 5,614,883 A | * | 3/1997 | Dery et al. | |
| 5,634,853 A | * | 6/1997 | Smith | ...................... 464/175 X |
| 5,672,113 A | * | 9/1997 | Tomogami et al. | .......... 464/175 |
| 6,224,066 B1 | * | 5/2001 | Oetiker | .................... 277/637 X |
| 6,398,265 B1 | * | 6/2002 | Sabo | ............................ 285/23 |

FOREIGN PATENT DOCUMENTS

| | | | | |
|---|---|---|---|---|
| DE | 42 07 849 | * | 9/1993 | ................. 285/236 |
| GB | 127475 | * | 6/1919 | ................. 464/175 |

* cited by examiner

*Primary Examiner*—Greg Binda
(74) *Attorney, Agent, or Firm*—MacMillan, Sobanski & Todd, LLC

(57) ABSTRACT

A slip yoke assembly for a vehicle drive train assembly includes a yoke shaft having an externally splined shaft portion and a slip shaft having a hollow internally splined portion disposed co-axially about the shaft portion of the yoke shaft. The yoke shaft and the slip shaft are axially movable with respect to each other and are engaged with each other for transmitting torque from one to the other. A flexible boot is provided for protectively covering the connection between the two splined members. The boot has a first clamping end disposed about the yoke shaft and a second clamping end disposed about the slip shaft. The first clamping end has a plurality of loops spaced circumferentially about the first clamping end. The loops are shaped to receive a band clamp and to retain the band clamp in position with respect to the first clamping end. The second clamping end has a plurality of loops spaced circumferentially about the second clamping end. The loops are shaped to receive a band clamp and to retain the band clamp in position with respect to the second clamping end.

2 Claims, 2 Drawing Sheets

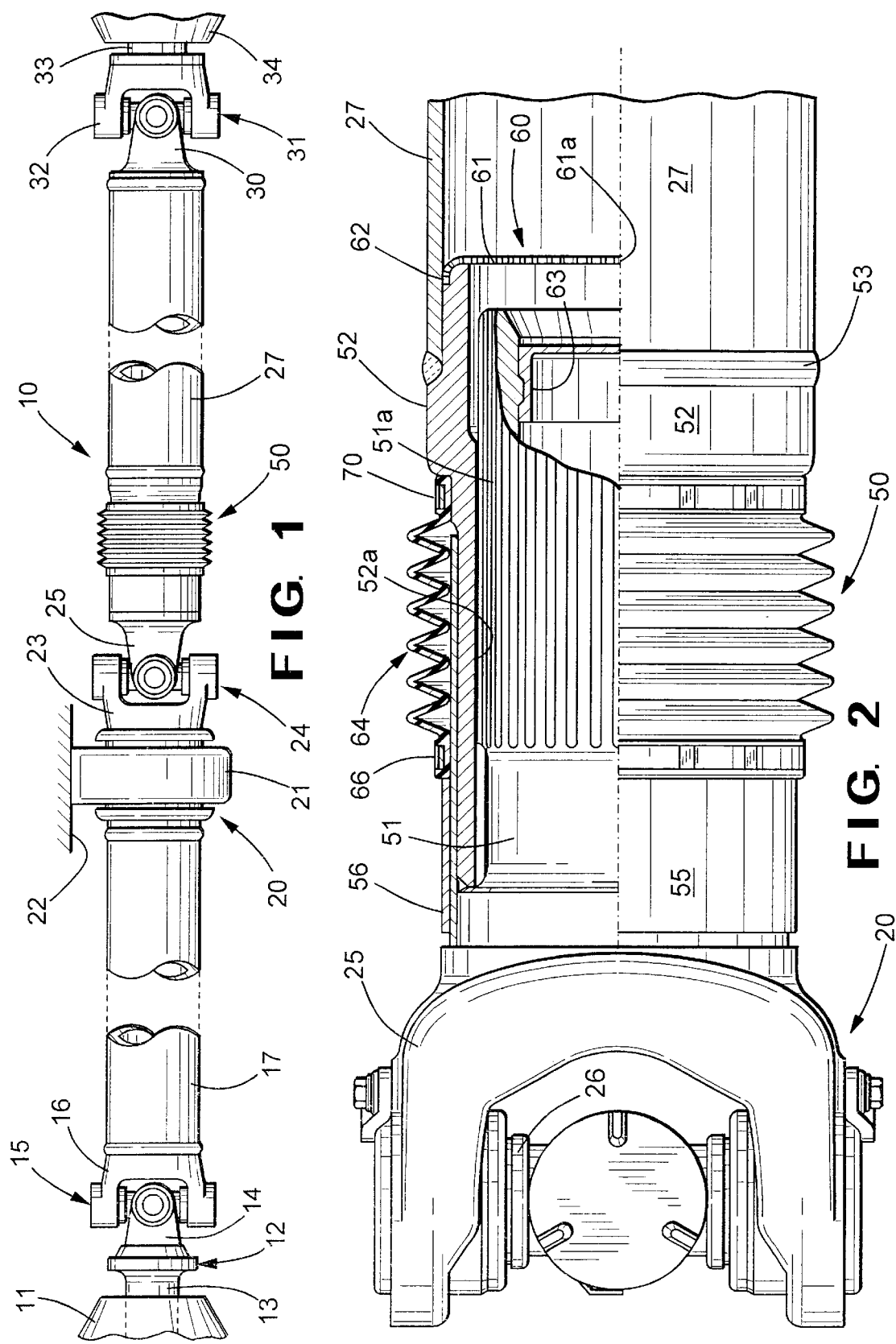

BOOT FOR SLIP YOKE ASSEMBLY IN A VEHICLE DRIVESHAFT

BACKGROUND OF THE INVENTION

This invention relates in general to flexible boots for protecting objects from contamination from moisture and dirt. In particular, this invention relates to an improved structure for such a flexible boot for protectively covering a joint between two relatively movable, torque transmitting devices, such as a slip yoke assembly adapted for use in a vehicle drive train assembly.

In most land vehicles in use today, a drive train assembly is provided for transmitting rotational power from an output shaft of an engine/transmission assembly to an input shaft of an axle assembly so as to rotatably drive one or more wheels of the vehicle. To accomplish this, a typical vehicular drive train assembly includes a hollow cylindrical driveshaft tube. A first universal joint is connected between the output shaft of the engine/transmission assembly and a first end of the driveshaft tube, while a second universal joint is connected between a second end of the driveshaft tube and the input shaft of the axle assembly. The universal joints provide a rotational driving connection from the output shaft of the engine/transmission assembly through the driveshaft tube to the input shaft of the axle assembly, while accommodating a limited amount of angular misalignment between the rotational axes of these three shafts.

Not only must the drive train assembly accommodate a limited amount of angular misalignment between the engine/transmission assembly and the axle assembly, but it must also typically accommodate a limited amount of axial movement between the engine/transmission assembly and the axle assembly. A small amount of such relative axial movement frequently occurs when the vehicle is operated. To address this, it is known to provide one or more slip yoke assemblies in the drive train assembly. A typical slip yoke assembly includes first and second splined members that are connected to respective components of the drive train assembly. The splined members provide a rotational driving connection transmitting torque from one torque from one component of the drive train assembly to another, while permitting a limited amount of axial movement between the components. In some instances, the first splined member may be provided on the end of a yoke connected to a universal joint assembly, while the second splined member may be connected to a driveshaft section of the drive train assembly.

As is well known in the art, most slip yoke assemblies are provided with sealing structures to prevent the entry of dirt, water, and other contaminants into the region where the splined members engage one another. Such contaminants can adversely affect the operation of the slip yoke assembly and cause premature failure. A number of sealing structures are known in the art for use with conventional slip yoke assemblies. Both exterior and interior sealing structures are typically be provided to fully protect the region where the splined members engage one another. Exterior sealing structures are disposed about the exterior of the slip yoke assembly and prevent contaminants from entering into this region from the exterior environment. Interior sealing structures are disposed within the slip yoke assembly and prevent contaminants from entering into this region through the hollow yokes or driveshaft sections connected to the splined members.

A typical exterior sealing structure for a slip yoke assembly is a boot that is formed having a series of convolutions of flexible material. One end of the boot is connected to the shaft of the slip yoke, while the other end of the boot is connected to the exterior of the corresponding slip shaft. The convolutions in the boot give it the ability to expand as necessary to accommodate the relative axial movement between the slip yoke and the slip shaft. The flexible boot usually has an annular groove molded into each end of the boot to receive an annular clamping band for securely engaging the boot with the slip yoke and slip shaft. Although the annular groove is provided for positively seating the band clamp, the band clamp is often difficult to install properly on the boot during assembly of the slip yoke assembly. Thus, it would be advantageous if there could be developed an improved structure for such a flexible boot that would facilitate the proper installation of the boot and band clamp.

SUMMARY OF THE INVENTION

This invention relates to an improved structure for a protective boot, wherein the boot includes a flexible, generally cylindrical main body and at least one generally cylindrical clamping end having a plurality of loops spaced circumferentially about the clamping end. The loops are shaped to receive a band clamp and retain the band clamp in position with respect to the clamping end, thereby making it easier to assemble the boot on the object to be protected. The clamping end may have a groove for receiving the band clamp, with the loops comprising generally flat webs bridging the groove and spaced circumferentially about the clamping end. In another embodiment of the invention, there is provided a torque transmitting device including a first drive member and a second drive member both mounted for rotation about a common axis. One of the drive members is axially movable with respect to the other, and the two drive members are engaged with each other for transmitting torque from one drive member to the other. A boot having a flexible, generally cylindrical main body and a generally cylindrical first clamping end is positioned about one of the drive members. The first clamping end has a plurality of loops spaced circumferentially about the first clamping end. The loops are shaped to receive a band clamp and to retain the band clamp in position with respect to the first clamping end. In yet another embodiment of the invention there is provided a slip yoke assembly for a vehicle drive train assembly. The slip yoke assembly includes a yoke shaft having an externally splined shaft portion, and a slip shaft having a hollow internally splined portion disposed co-axially about the shaft portion of the yoke shaft. The yoke shaft and the slip shaft are axially movable with respect to each other and are engaged with each other for transmitting torque from one to the other. Two band clamps, and a boot are provided. The boot has a first clamping end positioned about the yoke shaft and a second clamping end positioned about the slip shaft. The first clamping end has a plurality of loops spaced circumferentially about the first clamping end. The loops are shaped to receive a band clamp and to retain the band clamp in position with respect to the first clamping end. The second clamping end has a plurality of loops spaced circumferentially about the second clamping end. The loops are shaped to receive a band clamp and to retain the band clamp in position with respect to the second clamping end.

Various objects and advantages of this invention will become apparent to those skilled in the art from the following detailed description of the preferred embodiments, when read in light of the accompanying drawings.

BRIEF DESCRIPTION OF THE DRAWINGS

FIG. 1 is a side elevational view of a vehicle drive train assembly including a slip yoke assembly in accordance with this invention.

FIG. 2 is an enlarged top plan view, partially in cross section, of the slip yoke assembly illustrated in FIG. 1.

DETAILED DESCRIPTION OF THE PREFERRED EMBODIMENTS

Figure 3:
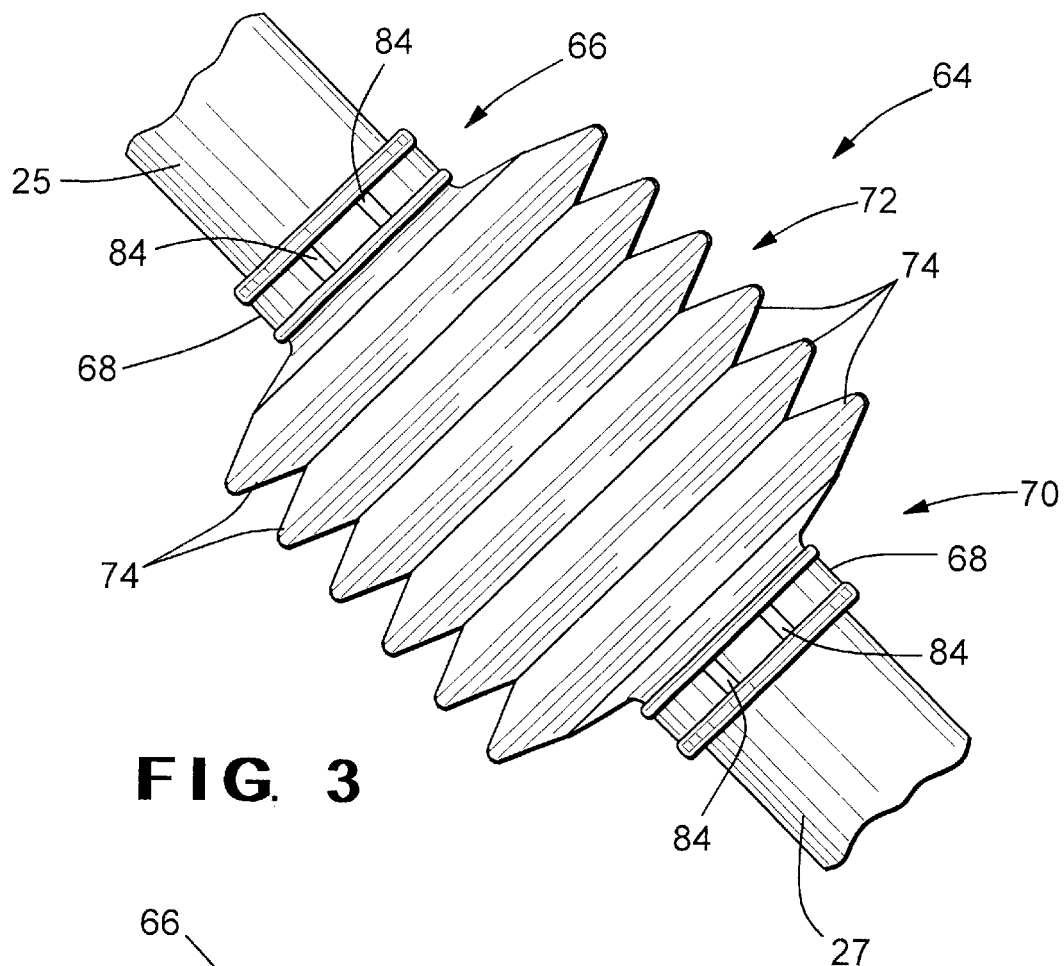
FIG. 3 is a side elevational view of the boot that protectively covers the slip yoke assembly illustrated in FIGS. 1 and 2.

Referring now to the drawings, there is illustrated in FIGS. 1 and 2 a drive train assembly, indicated generally at 10, for a vehicle that is adapted to transmit rotational power from an engine/transmission assembly 11 to a plurality of driven wheels (not shown). The engine/transmission assembly 11 is conventional in the art and includes an externally splined output shaft (not shown) that is connected to a first slip yoke assembly, indicated generally at 12. The first slip yoke assembly 12 is conventional in the art and includes an internally splined tubular end portion 13 that slidably engages the externally splined output shaft of the engine/transmission assembly 11. As a result, the tubular end portion 13 of the first slip yoke assembly 12 is rotatably driven by the output shaft of the engine/transmission assembly 11, but is free to move axially relative to the engine/transmission assembly to a limited extent.

The first slip yoke assembly 12 further includes a yoke 14, which forms one part of a first universal joint assembly, indicated generally at 15. The first universal joint assembly 15 is also conventional in the art and includes a tube yoke 16 that is connected to the yoke 14 by a cross in a known manner. The tube yoke 16 is secured, such as by welding, to a first end of a first driveshaft section 17 for rotation. The first universal joint assembly 15 therefore provides a rotational driving connection between the output shaft of the engine/transmission assembly 11 and the first driveshaft section 17, while permitting a limited amount of angular misalignment therebetween. Alternatively, the output shaft of the engine/transmission assembly 11 may terminate in a conventional end yoke (not shown) that is directly connected to the cross of the first universal joint assembly 15.

The first driveshaft section 17 extends through and is supported for rotation by a center bearing assembly, indicated generally at 20. The center bearing assembly 20 is conventional in the art and includes a rigid frame or bracket 21 that is secured to a portion of a frame, chassis, or body 22 of the vehicle. The first driveshaft section 17 terminates in a second end including an end yoke 23, which forms one part of a second universal joint assembly, indicated generally at 24. The second universal joint assembly 24 is also conventional in the art and includes a yoke shaft 25 that is connected to the end yoke 23 by a cross 26 (see FIG. 2) in a known manner. The second universal joint assembly 24 therefore provides a rotational driving connection between the first driveshaft section 17 and the yoke shaft 25, while permitting a limited amount of angular misalignment therebetween. The yoke shaft 25 is, in turn, connected through a second slip yoke assembly, indicated generally at 50, to a first end of a second driveshaft section 27. The structure and operation of the second slip yoke assembly 50 will be described in detail below.

The second driveshaft section 27 terminates in a second end having a tube yoke 30 secured thereto. The tube yoke 30 forms one part of a third universal joint assembly 31. The third universal joint assembly 31 is also conventional in the art and includes a tube yoke 32 that is connected to an input shaft 33 of an axle assembly 34 by a cross in a conventional manner. The third universal joint assembly 31 therefore provides a rotational driving connection between the second driveshaft section 27 and the input shaft 33 of the axle assembly 34, while permitting a limited amount of angular misalignment between them. The axle assembly 34 is conventional in the art and is adapted to transmit rotational power from the input shaft 33 to the driven wheels of the vehicle in a known manner.

Referring now to FIG. 2, the structure of the second slip yoke assembly 50 is illustrated in detail. As shown therein, the yoke shaft 25 includes a cylindrical shaft portion 51 having a plurality of external splines 51a formed on outer surface thereof. A hollow cylindrical transition member 52 is disposed co-axially about the shaft portion 51 of the yoke shaft 25 and is secured to the end of the second driveshaft section 27. The transition member 52 has a plurality of internal splines 52a formed on its inner surface, and these internal splines 52a cooperate with the external splines 51a formed on the shaft portion 51 of the yoke shaft 25 to transmit torque from one member to the other. As a result, the yoke shaft 25 is connected to the transition member 52 for rotational driving movement, while allowing limited relative axial movement to occur between the yoke shaft 25 and the transition member 52. The transition member 52 can be secured to the second driveshaft section 27 in any known manner, such as by welding 53. If desired, a hollow cylindrical weld ring 55 may secured to the yoke shaft 25 for rotational movement therewith. As shown in FIG. 2, the weld ring 55 may be secured to the yoke shaft 25 by press fitting it on a shoulder provided on the yoke shaft 25. The weld ring 55 provides an exterior surface to which one or more balance weights 56 may be secured to rotationally balance the slip yoke assembly 50 and, thus, the driveshaft assembly 10 during use. It can be seen that the yoke shaft 25 can be considered to be a first drive member, and that the second driveshaft section, which is a slip yoke, can be considered to be a second drive member, with both of the drive members being mounted for rotation about a common axis, with one of the drive members being axially movable with respect to the other, and with the two drive members being engaged with each other for transmitting torque from one drive member to the other.

A sleeve cup, indicated generally at 60, may be provided as a first interior seal structure to seal the splined connection between the transition member 52 and the shaft portion 51 of the yoke shaft 25. As shown in FIG. 2, the sleeve cup 60 includes a circular body portion 61 having a relatively short, axially extending flange portion 62. The circular body portion 61 of the sleeve cup 60 extends over the open end of the transition member 52, thereby preventing dirt, water, and other contaminants from entering into the splined connection between the transition member 52 and the shaft portion 51 of the yoke shaft 25 through the interior of the second driveshaft section 27. A central opening 61a may be formed through the circular body portion 61 of the to sleeve cup 60. The central opening 61a functions as a vent to prevent trapped air within the region of the splined connection between the transition member 52 and the shaft portion 51 of the yoke shaft 25 from causing ballooning of the flexible boot 64 when relative axial movement occurs.

The flange portion 62 of the sleeve cup 60 is retained within the slip yoke assembly 10 by frictional engagement between the inner cylindrical surface of the second driveshaft section 27 and the outer cylindrical surface of the transition member 52. The sleeve cup 60 can be installed by initially disposing it about the end of the transition member 52, then moving the second driveshaft section 27 axially over the top of it. Once the second driveshaft section 27 is secured to the transition member 52, the sleeve cup 60 will be permanently retained on the transition member. In this manner, the sleeve cup 60 can be quickly and easily installed without the use of special tools or other mounting structures.

A plug 63 may also be provided as a second interior seal structure to seal the splined connection between the transition member 52 and the shaft portion 51 of the yoke shaft 25. As shown in FIG. 2, the plug 63 is conventional in the art and is generally cup-shaped. The plug 63 is press fit into the open end of the shaft portion 51 of the yoke shaft 25 to prevent dirt, water, and other contaminants from entering into the splined connection between the transition member 52 and the shaft portion 51 of the yoke shaft 25 through the interior of the yoke shaft 25.

A boot, indicated generally at 64, is provided as an exterior seal structure to seal the splined connection between the transition member 52 and the shaft portion 51 of the yoke shaft 25. The boot 64 is preferably formed from a flexible material, such as a conventional elastomeric material, and is shaped having a plurality of convolutions or corrugations. A variety of materials are well known in the art for forming the boot 64. A first clamping end, indicated generally at 66, of the flexible boot 64 is secured to the weld ring 55 by a first conventional clamping mechanism, such as by a first band clamp 68. Similarly, a second clamping end, indicated generally at 70, of the flexible boot 64 is secured to the transition member 52 by a second conventional clamping mechanism, such as by a second band clamp 68. The boot 64 prevents dirt, water, and other contaminants from entering into the splined connection between the transition member 52 and the shaft portion 51 of the yoke shaft 25. During use, the yoke shaft 25 may move axially relative to the second driveshaft section 27. When such relative axial movement occurs, the boot 64 will expand and contract axially to accommodate such movement, while continuing to provide the desired sealing action. The band clamps 68 are intended to be representative of any mechanism that can retain the clamping ends 66 and 70 of the boot 64 to another structure.

As mentioned above, the weld ring 55 defines a relatively small annular space about the transition member 52. Typically, a quantity of lubricant is injected into the region of the splined connection between the transition member 52 and the shaft portion 51 of the yoke shaft 25 to facilitate relative axial movement. Any lubricant that escapes from the region of the splined connection will be trapped in the annular space defined between the weld ring 55 and the transition member 52. The retention of lubricant in this annular space is desirable because it reduces the amount of lubricant that would otherwise move into the region of the flexible boot 64. The accumulation of lubricant in the region of the flexible boot 64 is undesirable because it can cause ballooning of the flexible boot 64 when rotated at high speeds.

Figure 4:
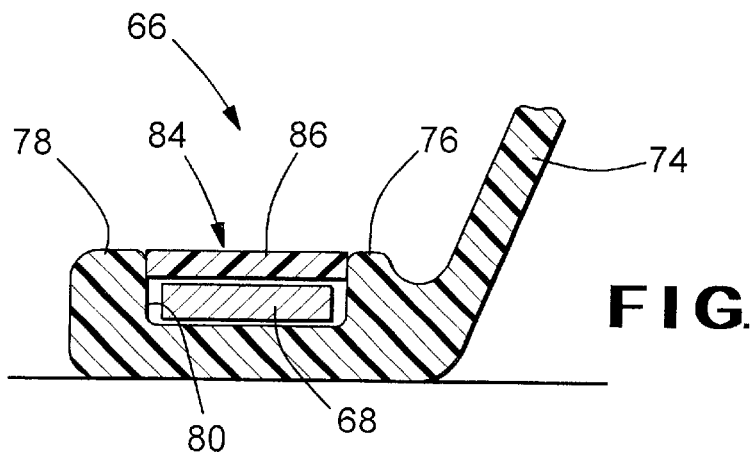
FIG. 4 is an enlarged sectional elevational of a first embodiment of the clamping end and band clamp of the boot illustrated in FIG. 3.

Referring specifically to FIG. 3, it can be seen that the boot 64 includes a main body portion, indicated generally at 72 extending between the first and second clamping ends 66 and 70. The main body portion 72 is provided with a plurality of convolutions 74 that enable the boot 64 to be compressed and expanded in the axial direction as the yoke shaft 25 and the slip yoke 27 move axially relative to one another. As best shown in FIG. 4, the first clamping end 66 of the boot 64 includes an inner annular ridge 76 that is formed adjacent to the convolutions 74 and an outer annular ridge 78 that is formed adjacent to, but spaced apart from, the inner annular ridge 76. Between the inner annular ridge 76 and the outer annular ridge 78, a groove 80 is defined that extends circumferentially around the first clamping end 66 of the boot 64. The purpose of the groove 80 is to receive and retain the relatively flat band clamp 68 therein. The band clamp 68 is provided with a tightening mechanism (not shown) that enables it to be tightened about the first clamping end 66 to secure the boot 64 to the yoke shaft 25. Band clamp tightening mechanisms of this general type are well known in the art.

The first clamping end 66 is provided with at least one (and preferably a is plurality) of loops, indicated generally at 84, that are spaced circumferentially about the first clamping end 66 and extend over the groove 80 between the inner annular ridge 76 and the outer annular ridge 78. The loops 84 are provided to secure the band clamp 68 to the first clamping end 66 of the boot 64 when the band clamp 68 is not tightened thereabout, as described above. By securing the band clamp 68 to the first clamping end 66, the bland clamp 68 will not fall off or become misaligned prior to or during the installation of the boot 64 onto the slip yoke assembly 50. This improvement will increase the production efficiency involved with putting together the slip yoke assembly 50 and will improve the product quality of the finished assembly. As shown in FIG. 3, the second clamping end 70 of the boot 64 is also provided with similar ridges 76 and 78, a groove 80, and a plurality of loops 84 to secure the boot 64 to the slip yoke 27.

FIG. 4 illustrates a first structure for the loops 84. As shown therein, the loops 84 are formed as generally flat webs 86 bridging the groove 80, with the webs 86 being spaced circumferentially about the first clamping end 66. As can be seen in FIG. 4, the loops 84 are generally flat and having a generally rectangular cross-sectional shape. However, the loops 84 may be formed having any desired shape, and any desired number of such loops 84 may be provided. Furthermore, the loops 84 need not extend completely across the groove 80, but rather may extend only partially across if desired. In a preferred embodiment of the invention, the loops 84 cover an amount within the range of from about five percent to about thirty percent of the circumferential length of the annular groove 80. The loops 84 can be formed from the same flexible, elastomeric material as the material of the boot 64. Alternatively, the loops 86 may be made of any other desired material that is suitable for retaining the band clamps 68 in the grooves 80, such as steel, for example.

If the boot 64 is made of a moldable material, such as a polymeric material, the loops 84 can be integrally molded from the same material when the boot 64 is molded. Alternatively, the loops 84 can be formed as separate pieces that are secured to the boot 64, such as shown in FIG. 4. For example, the loops 84 may be adhered to the boot 64 with an adhesive. Regardless, it can be seen that the loops 84 will retain the band clamp 68 in position with respect to the first clamping end 66 to facilitate securing the boot 64 to the yoke shaft 25.

During assembly or construction of the slip yoke assembly 50 for a vehicle drive train assembly, the first clamping end 66 of the boot 64 is positioned about the yoke shaft 25 and the second clamping end 70 is positioned about the slip yoke 27. A pair of band clamps 68 is held in place in the grooves 80 of the first and second clamping ends 66, 70 by a plurality of loops 84 spaced circumferentially about the first and second clamping ends. The loops 84 are shaped to receive the band clamps 68 and to retain the band clamps in position with respect to the first and second clamping ends 66, 70. After the boot and band clamps are in place, the clamps are tightened to secure the boot to the slip yoke assembly.

Figure 5:
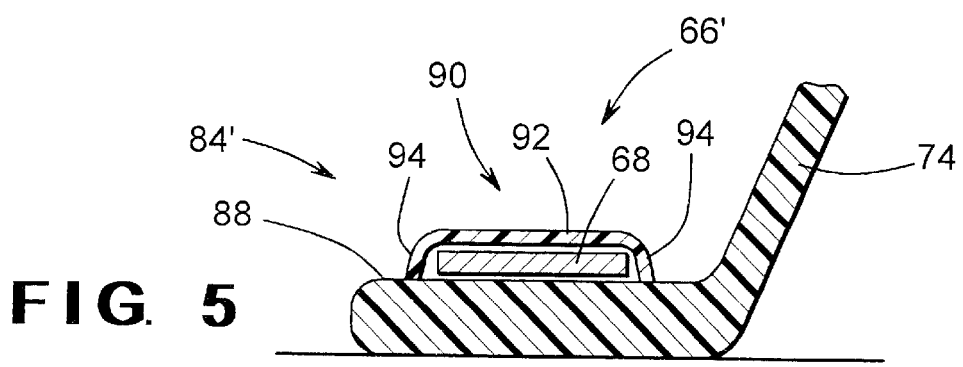
FIG. 5 is an enlarged sectional elevational of a second embodiment of the clamping end and band clamp of the boot illustrated in FIG. 3.

In a second embodiment of the invention shown in FIG. 5, the first clamping end 66 of the boot 64 is not formed having the annular ridges 76 and 78 or the groove 80. Rather, a modified first clamping end 66' of the boot 64 has a relatively flat annular surface 88 extending from the convolutions 74. In this embodiment, modified loops 84' are provided above the surface 88 of the first clamping end 66. The modified loops 84' are formed by a plurality of circumferentially spaced apart web structures, indicated generally at 90. Each of the web structures 90 includes a cross web 92 and a pair of side walls 94. As discussed above, such modified loops 84' can be formed integrally with the boot 64 or can be formed separately and secured thereto. The modified loops 84' retain the band clamp 68 on the first clamping end 66' of the boot 64 in the manner described above, without the use of an annular groove 80.

Although the boot 64 of the invention is shown as installed on a yoke shaft assembly 50, it is to be understood that the boot 64 can be used to protect numerous other objects. The boot 64 acts as an external protective device to prevent contamination of the object to be protected by such external substances as water, dirt and other contaminants.

In accordance with the provisions of the patent statutes, the principle and mode of operation of this invention have been explained arid illustrated in its preferred embodiment. However, it must be understood that this invention may be practiced otherwise than as specifically explained and illustrated without departing from its spirit or scope.

What is claimed is:

1. A protective boot assembly comprising:

a hollow, generally cylindrical boot including a body portion having at least one convolution formed therein and including first and second clamping ends extending from said body portion, said first clamping end having first and second ridges formed therein that define a groove therebetween and a web extending over said groove completely between said first and second ridges, wherein said body portion, said first and second clamping ends, and said first and second ridges are formed from a single piece of an elastomeric material; and a clamping mechanism disposed in said groove and retained in said groove by said web.

2. A protective boot assembly comprising:

a hollow, generally cylindrical boot including a body portion having at least one convolution formed therein and including first and second clamping ends extending from said body portion, said first clamping end having first and second ridges formed therein that define a groove therebetween and a web extending over said groove completely between said first and second ridges, wherein said body portion, said first and second clamping ends, said first and second ridges, and said web are formed from a single piece of an elastomeric material; and a clamping mechanism disposed in said groove and retained in said groove by said web.

* * * * *